(12) United States Patent
Brisken

(10) Patent No.: US 12,498,455 B2
(45) Date of Patent: Dec. 16, 2025

(54) SYSTEM AND METHOD FOR END OF LINE TEST AND CALIBRATION OF ANGULAR SCANNING RADAR

(71) Applicant: GM Cruise Holdings LLC, San Francisco, CA (US)

(72) Inventor: Stefan Andreas Brisken, Munich (DE)

(73) Assignee: GM Cruise Holdings LLC, San Francisco, CA (US)

( * ) Notice: Subject to any disclaimer, the term of this patent is extended or adjusted under 35 U.S.C. 154(b) by 547 days.

(21) Appl. No.: 17/494,869

(22) Filed: Oct. 6, 2021

(65) Prior Publication Data
US 2023/0105684 A1  Apr. 6, 2023

(30) Foreign Application Priority Data
Oct. 1, 2021 (EP) .................................. 21200494

(51) Int. Cl.
*G01S 7/40* (2006.01)
*G01S 13/42* (2006.01)

(52) U.S. Cl.
CPC .............. *G01S 7/40* (2013.01); *G01S 13/426* (2013.01)

(58) Field of Classification Search
CPC ................................ G01S 7/40; G01S 13/426
(Continued)

(56) References Cited

U.S. PATENT DOCUMENTS 5,818,383 A * 10/1998 Stockburger ............ G01S 7/415
    342/161
6,694,277 B2 * 2/2004 Schneider ............. G01S 13/931
    342/72

(Continued)

FOREIGN PATENT DOCUMENTS

AU  2020201378 A1 * 3/2020 ........... G01S 7/4026
EP     3364212 A1 * 8/2018 ........... G01S 7/4091
(Continued)

OTHER PUBLICATIONS

"Response to the Communication Pursuant to Rule 69 EPC for European Patent Application No. 21200494.9", Filed Date: Oct. 4, 2023, 14 pages.
(Continued)

*Primary Examiner* — Nuzhat Pervin
(74) *Attorney, Agent, or Firm* — Honigman LLP; Matthew H. Szalach; Jonathan P. O'Brien

(57) ABSTRACT

Systems and methods for calibrating a radar sensor based upon synthetic aperture radar (SAR) principles are described herein. A relative motion is induced between a radar sensor and a calibration target in the field-of-view of the radar sensor. The radar sensor receives returns from the calibration target. The radar sensor outputs, based upon the relative motion between the radar sensor and the calibration target, detections that are indicative of locations of points on the calibration target. A computing system generates calibration data based upon the detections, the calibration data comprising a correction factor between a position measured by the radar sensor and a corresponding true position of an object. The computing system programs the radar sensor based on the calibration data such that subsequent to being programmed, the radar sensor outputs detections based upon radar returns and the calibration data.

19 Claims, 7 Drawing Sheets

(58) Field of Classification Search
USPC .......................................................... 342/146
See application file for complete search history.

(56) References Cited

U.S. PATENT DOCUMENTS

| | | | | |
|---|---|---|---|---|
| 6,697,010 | B1* | 2/2004 | Lam | G01S 13/9029 |
| | | | | 342/25 R |
| 8,207,887 | B2* | 6/2012 | Goldman | G01S 13/9029 |
| | | | | 342/159 |
| 9,568,592 | B1* | 2/2017 | Brown | G01S 7/4004 |
| 10,024,955 | B2* | 7/2018 | Song | G01S 7/4972 |
| 10,180,494 | B2* | 1/2019 | Kuehnle | H01Q 1/32 |
| 10,191,144 | B2* | 1/2019 | Campbell | G01S 13/931 |
| 10,222,463 | B2* | 3/2019 | Hong | G01S 13/72 |
| 10,389,421 | B2* | 8/2019 | Lee | G01S 7/4021 |
| 10,698,094 | B2* | 6/2020 | Rudoy | G01S 15/46 |
| 10,809,355 | B2* | 10/2020 | Liu | G01S 13/584 |
| 10,809,374 | B2* | 10/2020 | Wetoschkin | G01S 13/931 |
| 10,830,869 | B2* | 11/2020 | Raphaeli | G01S 7/403 |
| 10,877,146 | B2* | 12/2020 | Koerber | G01S 13/42 |
| 11,313,946 | B2* | 4/2022 | Cejka | G01S 7/40 |
| 11,762,084 | B2* | 9/2023 | Poiger | G01S 13/345 |
| | | | | 342/59 |
| 11,860,267 | B2* | 1/2024 | Hong | G01S 13/003 |
| 2004/0233094 | A1* | 11/2004 | Isaji | G01S 7/4026 |
| | | | | 342/174 |
| 2010/0321234 | A1* | 12/2010 | Goldman | G01S 13/9029 |
| | | | | 342/25 A |
| 2011/0006944 | A1* | 1/2011 | Goldman | G01S 13/9054 |
| | | | | 342/25 A |
| 2012/0086593 | A1* | 4/2012 | Weber | G01S 7/4026 |
| | | | | 342/146 |
| 2015/0025786 | A1* | 1/2015 | Hohm | G06F 17/00 |
| | | | | 701/300 |
| 2015/0070207 | A1* | 3/2015 | Millar | G01S 13/4454 |
| | | | | 342/174 |
| 2016/0161597 | A1* | 6/2016 | Treptow | G01S 13/424 |
| | | | | 342/174 |
| 2016/0202352 | A1* | 7/2016 | Runge | G01S 13/86 |
| | | | | 342/146 |
| 2016/0223649 | A1* | 8/2016 | Schwindt | G01S 7/4026 |
| 2016/0245899 | A1* | 8/2016 | Rybski | G01S 7/497 |
| 2016/0377702 | A1* | 12/2016 | Yomo | G01S 7/4026 |
| | | | | 342/173 |
| 2017/0322295 | A1* | 11/2017 | Loesch | G01S 13/931 |
| 2018/0024235 | A1* | 1/2018 | Hong | G01S 13/87 |
| | | | | 342/59 |
| 2019/0025405 | A1* | 1/2019 | Liu | G01S 7/4026 |
| 2019/0285729 | A1* | 9/2019 | Tietze | G01S 7/4026 |
| 2020/0011969 | A1* | 1/2020 | Noro | G01B 21/24 |
| 2022/0146626 | A1* | 5/2022 | Wodrich | G01S 13/931 |
| 2022/0229167 | A1* | 7/2022 | Loesch | G01S 7/4026 |
| 2022/0268887 | A1* | 8/2022 | van Meurs | G01S 7/4026 |
| 2023/0056655 | A1* | 2/2023 | Talai | G01S 7/4034 |
| 2023/0322268 | A1* | 10/2023 | Linnemann | B60W 60/001 |
| | | | | 701/23 |
| 2025/0004118 | A1* | 1/2025 | Himmelstoss | G01S 7/4091 |

FOREIGN PATENT DOCUMENTS

| | | | | | |
|---|---|---|---|---|---|
| EP | 3410145 | A1 * | 12/2018 | | G01S 13/87 |
| EP | 4102255 | A2 * | 12/2022 | | G01S 7/497 |
| EP | 3341752 | B1 * | 3/2023 | | G06V 20/64 |
| EP | 4160257 | A1 | 4/2023 | | |
| WO | WO-2019018201 | A1 * | 1/2019 | | G01S 13/931 |

OTHER PUBLICATIONS

"Extended European Search Report for European Patent Application No. 21200494.9", Mailed Date: Mar. 14, 2022, 15 pages.

* cited by examiner

SYSTEM AND METHOD FOR END OF LINE TEST AND CALIBRATION OF ANGULAR SCANNING RADAR

RELATED APPLICATION

This application claims priority to European Patent Application No. EP21200494.9, filed on Oct. 1, 2021, and entitled "SYSTEM AND METHOD FOR END OF LINE TEST AND CALIBRATION OF ANGULAR SCANNING RADAR". The entirety of this application is incorporated herein by reference.

BACKGROUND

Automotive radar can be used to identify positions of objects in a driving environment of a vehicle. For example, a radar sensor can be configured to output detections that are indicative of points in a driving environment in which the radar sensor is employed, the points being locations of surfaces of objects in the driving environment. Due to various imperfections and non-idealities, detections output by a radar sensor can be subject to various measurement errors. In other words, the radar sensor can output, based upon a radar return from an object, a detection that indicates that the object is at a first location when the object is in fact at a second location.

Some measurement errors of a radar sensor can be corrected by appropriate calibration of the radar sensor. Conventionally, collection of data for calibration of a radar sensor that incorporates a two-dimensional radar antenna array is accomplished by mechanically aiming the radar sensor using a two-axis positioning system (e.g., a two-axis gimbal). In the conventional approach, a reflector is positioned at a known position relative to the radar sensor mounted on the two-axis positioning system. The radar sensor is mechanically aimed in a plurality of different directions relative to a reference direction, such that the reflector lies at a known azimuth and elevation relative to a center of the field-of-view (FOV) of the radar sensor. For each of the aimed directions, the radar sensor receives a return from the reflector, and a measured location of the reflector is determined based upon the return. The measured location can be compared to the known location of the reflector to determine a calibration value that can be used to correct for any difference between the measured and known locations. A number of the aimed locations depends upon a desired calibration sensitivity. To achieve a calibration resolution of about one degree the conventional two-axis-positioner approach can take several hours to collect data for each radar sensor that is desirably calibrated.

SUMMARY

The following is a brief summary of subject matter that is described in greater detail herein. This summary is not intended to be limiting as to the scope of the claims.

Described herein are various technologies pertaining to calibration of a radar sensor by employing synthetic aperture radar (SAR) techniques. With more specificity, described herein are various technologies pertaining to end-of-line calibration of a radar sensor that incorporates a 2D antenna array. In contrast with conventional calibration procedures that rely on a two-axis positioner, radar calibration technologies described herein can be used to perform calibration of a radar sensor within minutes or seconds rather than several hours.

A system for calibration of a radar sensor by employing SAR techniques includes a calibration target, a positioning device, and a radar sensor that is desirably calibrated, which may be referred to alternately as a device under test (DUT). The system can further include a computing device or other hardware logic component that is in communication with the radar sensor. In exemplary embodiments, the calibration target can be composed of a radar-absorbing material. The radar-absorbing material can be selected based upon a range of frequencies of radar signals output by the radar sensor. The radar-absorbing material is configured to absorb a sufficient amount of energy to prevent multipath propagation of radar signals output by the radar sensor, while reflecting sufficient energy to allow reflected signals to be detected at the radar sensor.

In various embodiments, the radar sensor, or DUT, can be mounted on the positioning device. The positioning device is configured to move the radar sensor to impart a relative motion between the calibration target and the radar sensor. In other embodiments, the calibration target can be mounted on the positioning device and the calibration target can be moved so as to impart a relative motion between the calibration target and the radar sensor. By virtue of the relative motion between the calibration target and the radar sensor imparted by the positioning device, the calibration target appears to move through an FOV of the radar sensor. In an exemplary embodiment, the positioning device can be a linear positioner (e.g., a motorized cart that is movable along a rail), and one of the calibration target or the radar sensor can be moved in a linear fashion along the linear positioner.

During the relative motion of the radar sensor and the calibration target, the radar sensor emits radar signals into its FOV and receives returns from the calibration target. The radar sensor can determine, based upon a received return, a range to a point on the calibration target and a radial velocity of the point relative to the radar sensor. In some embodiments, the radar sensor can output the range and the radial velocity of the point to a computing device for performance of further calibration operations, as described below. In other embodiments, the range and the radial velocity are computed by a hardware logic component included on the radar sensor, and further calibration operations can be performed by the same hardware logic component.

In various embodiments, either the aforementioned computing device or hardware logic component can be configured to identify an azimuth angle of the point relative to a center of the FOV of the radar sensor based upon the radial velocity and a velocity the radar sensor and/or the calibration target. As indicated above, the radial velocity can be determined by the radar sensor based upon a radar return received from the calibration target during relative motion of the radar sensor and the calibration target. The velocity of the radar sensor and/or the calibration target is received by the computing device or the hardware logic component of the radar sensor from one of a controller of the positioning device or a velocity sensor that is configured to output a velocity of an object that is moved by the positioning device.

The computing device or the hardware logic component is configured to employ SAR techniques to compute the azimuth angle to the point. With greater specificity, the computing device or the hardware logic component is configured to compute an azimuth angle to the point based upon the radial velocity of the radar sensor with respect to the point and based further upon the relative motion between the radar sensor and the calibration target. For example, the sine of the azimuth angle $\phi$ is related to the radial velocity and a second velocity that is the relative velocity of the radar sensor to the calibration target in a direction normal to the aiming angle of the center of the FOV of the radar sensor. In one exemplary embodiment, the computing device or the hardware logic component can compute the azimuth angle $\phi$ as the inverse sine of the ratio of these two velocities.

The positioning device can be configured to move the radar sensor and/or the calibration target such that the calibration target crosses the entirety of the FOV of the radar sensor. Thus, the radar sensor receives radar returns from the calibration target across the full range of azimuth angles in the FOV of the radar sensor as the radar sensor and/or the calibration target are moved relative to one another. The hardware logic component of the radar sensor or the computing device can be configured to compute, based upon the radar returns and the relative motion of the radar sensor and the calibration target, a plurality of measured azimuth angles that are representative of positions of one or more portions of the calibration target within the FOV of the radar sensor.

Since the relative motion between the radar sensor and the calibration target is controlled by the positioning device, the position of the calibration target within the FOV of the radar sensor is known during the relative motion of the radar sensor and the calibration target. Accordingly, for each of the plurality of measured azimuth angles, there is a known actual position of the calibration target. The computing device or the hardware logic component can compute a correction factor that is the difference between the measured azimuth angle and the actual azimuth angle of the calibration target at the time corresponding to the measured azimuth angle.

In embodiments wherein the radar sensor incorporates a two-dimensional antenna array, elevation angle correction factors can be determined in a substantially similar fashion to an azimuth correction factor. In an exemplary embodiment, subsequent to determining azimuth angle correction factors, the radar sensor can be rotated by 90°, and the positioning device can again impart the relative motion between the calibration target and the radar sensor. Due to the rotation of the radar sensor, the calibration target appears, from the perspective of the radar sensor, to move through the FOV of the radar sensor along the elevation direction. The radar sensor receives radar returns from the calibration target as the calibration target moves through the FOV of the radar sensor along the elevation direction. Measured elevation angles can be computed based upon these radar returns and the relative motion between the radar sensor and the calibration target. These measured elevation angles can then be compared to known actual elevation of the calibration target relative to the radar sensor to determine elevation correction factors. Accordingly, systems and methods described herein are suited to rapidly collecting radar returns that can be used for calibration of a radar sensor across the entirety of the FOV of the radar sensor.

The radar sensor can be programmed based upon the computed correction factors (e.g., in azimuth and elevation). Subsequent to being programmed, the radar sensor is configured such that responsive to receiving a radar return, the radar sensor outputs a detection indicative of a position of an object from which the return was received based upon the return and the correction factors. In a non-limiting example, responsive to computing a measured azimuth angle based upon a radar return, the radar sensor can add to the measured azimuth angle a correction factor that corresponds to the measured azimuth angle to yield a corrected azimuth angle. The radar sensor outputs a detection that indicates that the object has a position defined in part by the corrected azimuth angle.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to calibrating a radar sensor are described herein. With more particularity, technologies described herein facilitate generating calibration data for a radar sensor based upon SAR principles. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 1:
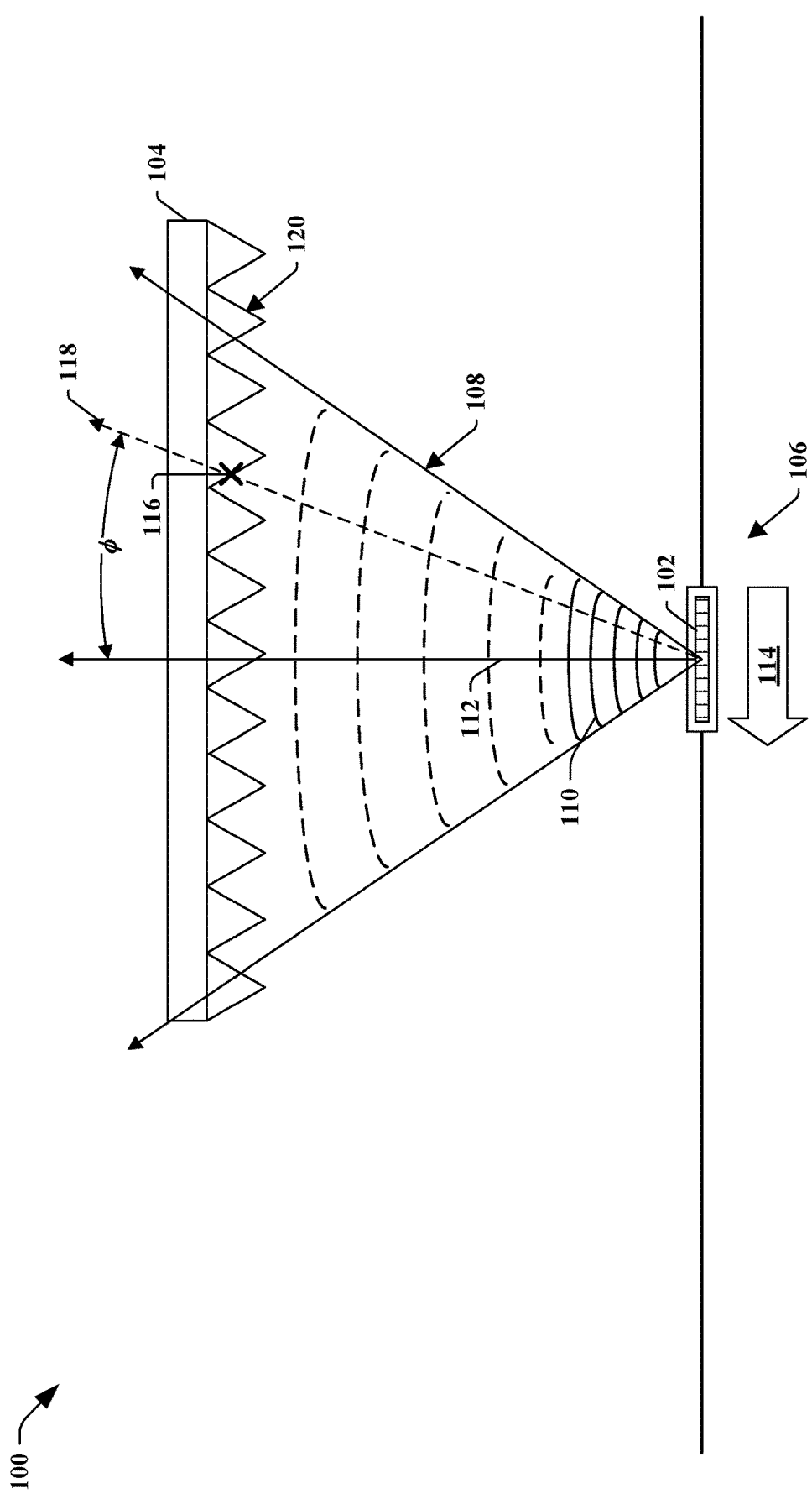
FIG. 1 is a top-down view of an exemplary radar calibration system.

With reference now to FIG. 1, an exemplary radar calibration system 100 is illustrated. The system 100 includes a radar sensor 102, a calibration target 104, and a positioning device 106. Briefly, and as will be described in greater detail below, the positioning device 106 imparts a relative motion between the radar sensor 102 and the calibration target 104 (e.g., by moving one or both of the radar sensor 102 or the calibration target 104). During the relative motion of the radar sensor 102 and the calibration target 104, the radar sensor 102 receives radar returns from the calibration target 104 and outputs detections that are indicative of locations of points on the calibration target 104 (e.g., three dimensional coordinates), the detections being values computed based upon the radar returns. Calibration data that includes correction factors between the computed detections and known positions of the calibration target 104 can be computed (e.g., by a computing device 202 shown in FIG. 2). The radar sensor 102 can be programmed such that, subsequent to being programmed, the radar sensor 102 outputs detections that are based upon the calibration data.

The radar sensor 102 is positioned such that an FOV 108 of the radar sensor 102 includes the calibration target 104. The radar sensor 102 is configured to emit a radar signal 110 into the FOV 108 and toward the calibration target 104. The radar sensor 102 is positioned such that the calibration target 104 is within a region where far-field conditions pertain with respect to propagation of the radar signal 110. The radar sensor 102 receives radar returns from the calibration target 104. The radar sensor 102 is configured to output detections that are indicative of locations of points on surfaces from which the radar returns are received. By way of example, and not limitation, a detection can include one or more of an azimuth angle of the point (relative to a reference direction 112 at the center of the FOV 108), an elevation angle of the point (relative to the reference direction 112), range to the point, radial velocity of the radar sensor 102 relative to the point, or signal magnitude of the radar return.

The calibration target 104 can have any of various configurations. In an exemplary embodiment, the calibration target 104 comprises a substantially straight wall. In this and other embodiments, the calibration target 104 can include a surface 120 that is composed of a radar-absorbing material. The radar-absorbing material can be selected to prevent multipath propagation of radar signals back to the radar sensor 102 while still permitting single-path radar returns to be received from the surface 120. The radar-absorbing surface 120 of the calibration target 104 can be formed with geometries that are designed to reflect impinging radar signals back to their source.

The positioning device 106 is configured to impart a relative motion between the radar sensor 102 and the calibration target 104 such that the calibration target 104 appears to move through the FOV 108 of the radar sensor 102. In the exemplary system 100, the radar sensor 102 is mounted on the positioning device 106 such that the positioning device 106 controls a position of the radar sensor 102. However, it is to be understood that in other embodiments, the calibration target 104 can instead be mounted on a positioning device while the radar sensor 102 remains at a fixed location. In various embodiments, the positioning device 106 can be a linear positioner that is configured to move the radar sensor 102 (or the calibration target 104) in a direction 114 that is orthogonal to the reference direction 112 at the center of the FOV 108. The linear positioner can be, for example, a cart and rail system wherein the radar sensor 102 is mounted on a cart that moves along a linear rail. In embodiments wherein the calibration target 104 is a substantially straight wall, the linear rail can be positioned parallel to the wall such that the direction 114 along which the radar sensor 102 travels is parallel to the wall.

The radar sensor 102 emits radar signals toward the calibration target 104 during relative motion of the radar sensor 102 and the calibration target 104. Similarly, the radar sensor 102 receives radar returns from the calibration target 104 during the relative motion of the radar sensor 102 and the calibration target 104. Due to the relative motion of the radar sensor 102 and the calibration target 104, the radial velocity of the radar sensor 102 relative to the point can be computed based upon a doppler frequency shift of the received return compared to the transmitted radar signal. As will be described in greater detail below, the radial velocity of the radar sensor 102 relative to a point on the calibration target 104 can be used to compute an azimuth angle to the point.

Figure 2:
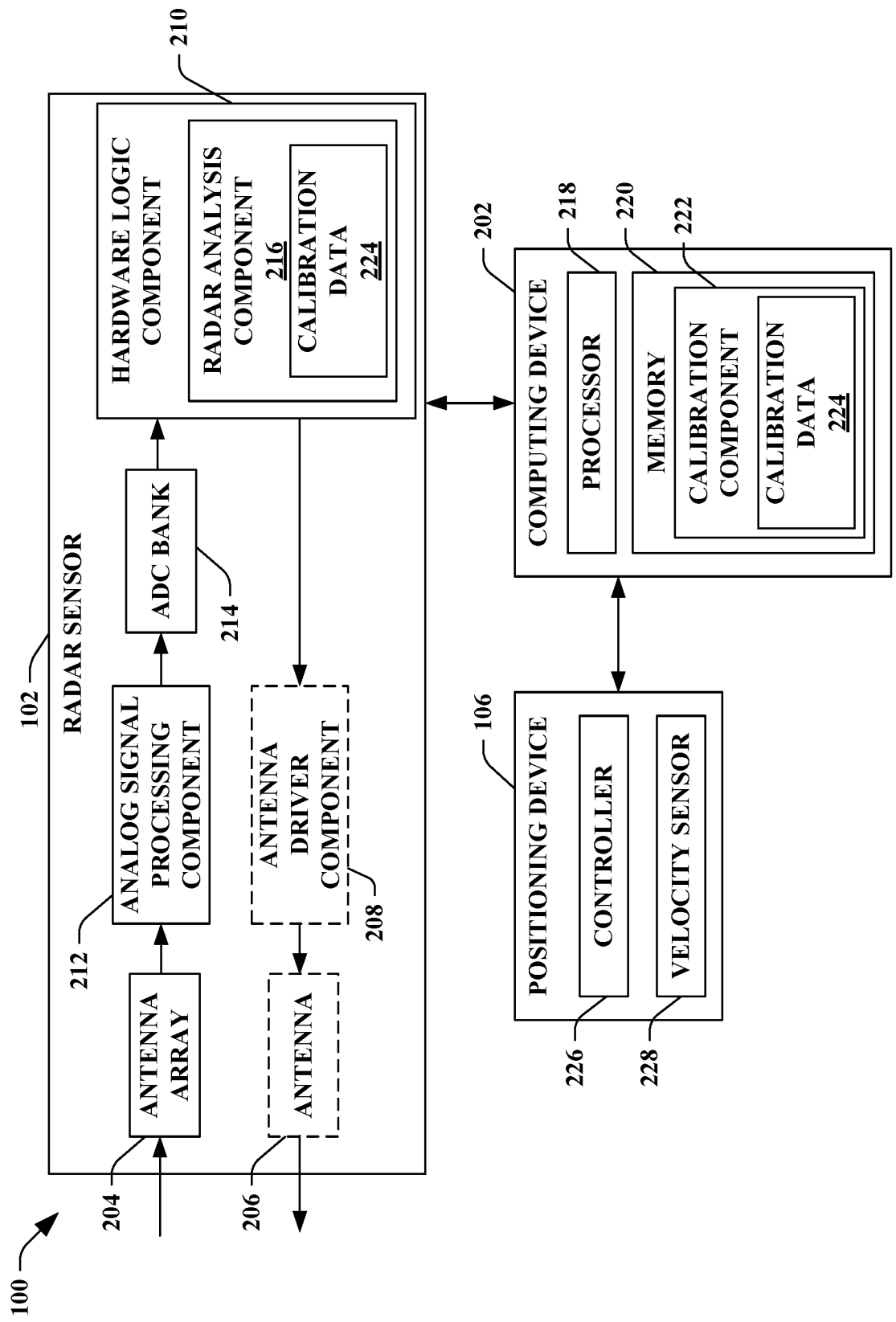
FIG. 2 is a functional block diagram of certain features of the radar calibration system of FIG. 1.

Detections output by the radar sensor 102 during relative motion of the radar sensor 102 and the calibration target 104 while the calibration target 104 is within the FOV 108 can be employed to calibrate the radar sensor 102. Referring now to FIG. 2, further details of the exemplary calibration system 100 are shown. As shown in FIG. 2, the system 100 further includes a computing device 202. The radar sensor 102 and the positioning device 106 are configured to perform functionality described above with respect to FIG. 1. The computing device 202 is configured to receive detections from the radar sensor 102 (e.g., detections that are representative of radar returns received by the radar sensor 102 from the calibration target 104) and to generate calibration data pertaining to the radar sensor 102. The computing device 202 can then program the radar sensor 102 based upon the calibration data, such that subsequent to being programmed, the radar sensor 102 outputs detections based upon radar returns and based further upon the calibration data.

Figure 3:
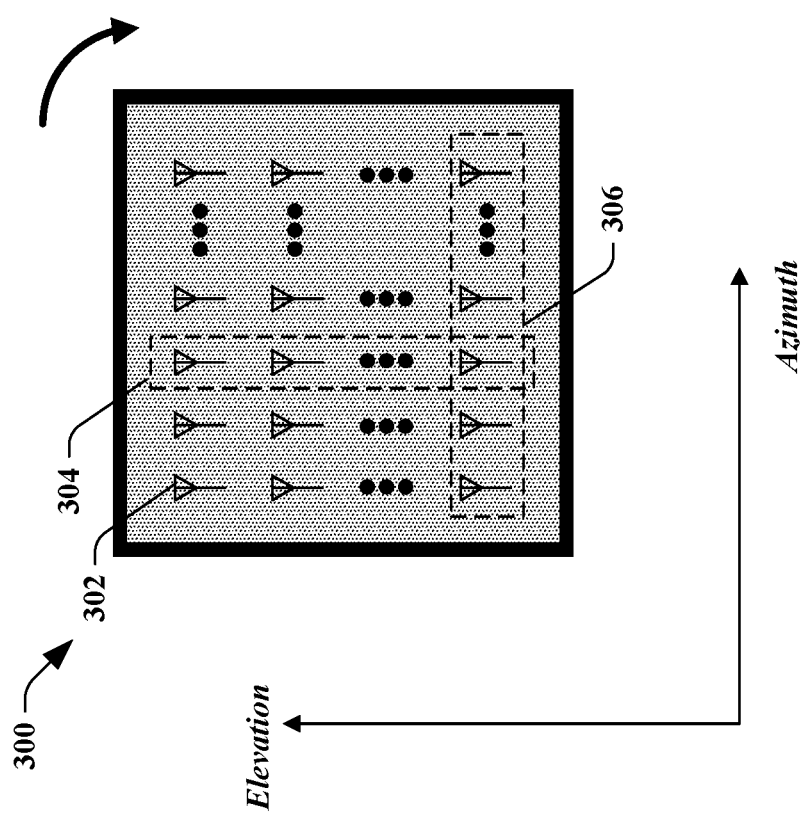
FIG. 3 is a head-on view of an exemplary antenna array.

Various exemplary operations of the system 100 are now described in greater detail below. The radar sensor 102 includes an antenna array 204. In exemplary embodiments, the antenna array 204 is a two-dimensional antenna array. By way of example, and referring now to FIG. 3, an exemplary antenna array 300 is shown wherein the antenna array 300 includes a plurality of antennas 302, arranged in n rows (e.g., a row 304) and m columns (e.g., a column 306), where n and m are non-zero integers. The antennas 302 of the array 300 can be configured to be collectively controlled by way of electronic beamforming techniques.

In exemplary embodiments, elevation and azimuth angles of a point in an operational environment of the array 300 can be determined based upon various angle of arrival techniques. By way of example, and not limitation, an elevation angle of the point can be determined based upon angle estimation techniques such as interferometry, array beamforming, or time difference of arrival (TDOA) of a radar return between antennas in different rows of the array 300. In a specific example, an azimuth angle of the point can be determined based upon TDOA of the radar return between antennas in different columns of the array 300. As will be described in greater detail below, azimuth or elevation angles of points in the FOV 108 of the radar sensor 102 can further be determined using SAR techniques based upon the relative motion of the radar sensor 102 and the calibration target 104.

The antenna array 204 is configured for receipt of radar returns from an operational environment of the radar sensor 102 (e.g., from the calibration target 104). In some embodiments, one or more antennas of the array 204 can further be configured to transmit radar signals. However, in other embodiments, the radar sensor 102 can include a distinct transmit antenna 206 (or antenna array) that is configured to transmit radar signals into the operational environment of the sensor 102. The radar sensor 102 can further include an antenna driver component 208 that is configured to electrically drive the antenna 206 to transmit radar signals. The radar sensor 102 can include a hardware logic component 210 that is configured to perform various control and processing functions of the radar sensor 102. In non-limiting embodiments, the hardware logic component 210 can be or include a field-programmable gate array (FPGA) or an application-specific integrated circuit (ASIC). The hardware logic component 210 can be configured to control the antenna driver component 208 to cause the antenna 206 to transmit any of various types of radar signals. For instance, the hardware logic component 210 can control the antenna driver component 208 such that the antenna 206 outputs a pulsed radar signal, a continuous wave radar signal, a frequency-modulated radar signal, etc.

The radar sensor 102 further includes an analog signal processing component 212 that is configured to perform various analog signal processing operations on returns received by the antenna array 204. The processed returns (output by the analog signal processing component 212) are received at a bank of analog-to-digital converters 214. The ADC bank 214 digitally samples the processed returns and outputs digital values that collectively make up a digital representation of the processed returns. This digital representation of the returns is received at the hardware logic component 210.

The hardware logic component 210 includes a radar analysis component 216 that is configured to compute one or more detections based upon the digital radar returns received at the hardware logic component 210. As indicated above, the detections output by the radar analysis component 216 can include one or more of an azimuth angle of a point on the calibration target 104, an elevation angle of the point, range to the point, radial velocity of the radar sensor 102 relative to the point, or signal magnitude of the radar return.

The detections computed by the radar analysis component 216 are received by the computing device 202. The computing device 202 includes a processor 218 and memory 220. The processor 218 is operably coupled to the memory 220 and is configured to execute instructions that are stored in the memory 220. The memory 220 includes a calibration component 222 that is configured to generate calibration data 224 based upon the detections output by the radar analysis component 216. The calibration data 224 is indicative of correspondence between measured positions of points in the FOV 108 of the radar sensor 102 and actual positions of points in the FOV 108. In an exemplary embodiment, the calibration data 224 comprises a plurality of correction factors. Each of the correction factors can be associated with an azimuth-elevation coordinate pair. For example, each correction factor is representative of a difference between the measured azimuth and an actual azimuth at a given elevation angle, or a difference between the measured elevation and an actual elevation at a given azimuth angle. Stated differently, the calibration data 224 can be or include a lookup table that is indicative of a respective corrected azimuth-elevation pair corresponding to each of a plurality of measured azimuth-elevation pairs. Put yet another way, the calibration data 224 indicates that when an initial azimuth-elevation pair is measured by the radar sensor 102, a corrected azimuth-elevation pair indicated by the calibration data 224 is to be output by the radar sensor 102. The computing device 202 can program the radar analysis component 216 to include the calibration data 224. Subsequently, the radar analysis component 216 can output detections based upon radar returns received by the radar sensor 102 and the calibration data 224.

As indicated above, an azimuth angle to a point in an FOV of a radar can be computed by the radar analysis component 216 based upon angle estimation techniques due to a return being received by horizontally offset antennas of an antenna array. Further, due to the relative motion of the radar sensor 102 and the calibration target 104, the radar analysis component 216 can compute the azimuth angle of a point in the FOV 108 based upon SAR techniques. By employing SAR techniques, the radar analysis component 216 can, in some embodiments, compute the azimuth angle of a point in the FOV 108 from which a radar return is received with a greater resolution than computations based solely on angle estimation techniques like TDOA between horizontally offset antennas of the radar sensor 102 or interferometry. In an illustrative example, and referring once again to FIG. 1, the radar sensor 102 can receive a radar return from a point 116 on the calibration target 104. The radar analysis component 216 can compute a radial velocity of the radar sensor 102 with respect to the point 116 based upon a doppler frequency shift of the return received from the point 116 relative to the signal 110 transmitted by the radar sensor 102. The radial velocity is a velocity of the radar sensor 102 relative to the point 116 along a line-of-sight direction 118 to the point 116. The azimuth angle, $\phi$, of the point 116 is an angle in the horizontal plane between the reference direction 112 at the center of the FOV 108 and the direction 118 to the point 116.

The radar analysis component 216 can be configured to compute the azimuth angle $\phi$ based upon the radar return received from the point 116 and the radial velocity of the radar sensor 102 relative to the point 116. In an exemplary embodiment wherein the reference direction 112 is normal to the direction of motion of the radar sensor 102, the radar analysis component 216 can compute the azimuth angle $\phi$ based upon the following equation:

$$\sin \phi = v_{radial}/v_{forward} \qquad \text{Eq. 1}$$

where $v_{radial}$ is the radial velocity of the radar sensor 102 relative to the point 116 along the line-of-sight direction 118, and $v_{forward}$ is the forward velocity of the radar sensor 102 in the direction 114. As indicated above, the radial velocity of the radar sensor 102 relative to the point 116 can be computed by the radar analysis component 216 based upon the radar return received from the point 116 (e.g., based upon a doppler frequency shift of the received return relative to the transmitted radar signal). The radar analysis component 216 can receive data indicative of the forward velocity of the radar sensor 102 from the positioning device 106 or the computing device 202.

Referring again to FIG. 2, in an exemplary embodiment, the positioning device 106 comprises a controller 226 and a velocity sensor 228. The controller 226 is configured to provide control signals to various components of the positioning device 106 to effectuate intended motion of the radar sensor 102. In a non-limiting example wherein the positioning device is a linear cart and rail positioning system, the controller 226 can output a control signal to the cart that causes the cart to traverse the rail at a predefined speed. In some embodiments, the controller 226 is configured to control the positioning device 106 based upon control parameters received by the controller 226 from the computing device 202. By way of example, a user of the computing device 202 can set forth user input at the computing device 202 that indicates motion of the positioning device 106 that is desired by the user. For instance, the user can set forth user input indicative of a desired velocity of the radar sensor 102 in the forward direction 114. The computing device 202 can output control parameters to the controller 226 based upon the user input. The controller 226 can control operation of the positioning device 106 based upon the control parameters so as to effectuate motion of the radar sensor 102 in the forward direction 114 at the desired velocity.

In various embodiments, either of the controller 226 or the computing device 202 can output data indicative of an intended forward velocity of the radar sensor 102 (e.g., a desired velocity specified by user input to the computing device 202) to the hardware logic component 210 of the radar sensor 102. The radar analysis component 216 can compute the azimuth angle $\phi$ of the point 116 based upon the intended forward velocity received from the controller 226 or the computing device 202. For instance, the radar analysis component 216 can use the intended forward velocity as the value of $v_{forward}$ in Eq. 1 when solving for the azimuth angle $\phi$. In other embodiments, the velocity sensor 228 can output to the hardware logic component 210 a measured velocity of the radar sensor 102 in the forward direction 114 (e.g., as distinct from an intended velocity specified by control parameters of the controller 226). In these embodiments, the radar analysis component 216 can use the measured velocity of the radar sensor 102 in the forward direction 114 as the value of $v_{forward}$ in Eq. 1 when solving for the azimuth angle $\phi$.

Responsive to receiving detections from the radar sensor 102, the calibration component 222 can compute correction factors based upon measured angles indicated in the detections and a known position of the calibration target 104. For example, the calibration component 222 can include data indicative of a known geometry of the calibration target 104 and a location of the calibration target 104 relative to the positioning device 106 (e.g., a distance from the positioning device 106 to the calibration target 104). Further, the calibration component 222 can receive positioning data from the positioning device 106. In a non-limiting example wherein the positioning device 106 is a linear positioner on which the radar sensor 102 is mounted, the positioning data can comprise a location of the radar sensor 102 along the linear positioner. Based upon the known geometry of the calibration target 104, the location of the calibration target 104 relative to the positioning device, and the positioning data output by the positioning device 106, the calibration component 222 can compute a true three-dimensional location of a point corresponding to a received radar return. The calibration component 222 can then compute correction factors for coordinates of the detection corresponding to the return based upon the computed true location. For instance, the detection can include measured azimuth-elevation-range coordinates $[\phi_1, \theta_1, r_1]$. The known true location of the point computed by the calibration component 222 can include azimuth-elevation-range coordinates $[\phi_2, \theta_2, r_2]$. The calibration component 222 can compute an azimuth-elevation correction factor pair $[\phi_c, \theta_c]$ wherein $\phi_c=\phi_2-\phi_1$ and $\theta_1=\theta_2-\theta_1$. The correction factor pair $[\phi_c, \theta_c]$ can be included in the calibration data 224 as entries in a lookup table indicating that when the radar analysis component 216 computes a detection having azimuth-elevation coordinates $\phi_1, \theta_1$, the radar analysis component 216 should output a detection having azimuth-elevation coordinates $[\phi_1+\phi_c, \theta_1+\theta_c]$ In some embodiments, the radar analysis component 216 is configured to compute the measured azimuth angle to a point based upon angle estimation techniques. In these embodiments, the radar analysis component 216 outputs detections that include a measured azimuth angle to a point computed based upon angle estimation techniques and a radial velocity of the point relative to the radar sensor 102 computed based upon a doppler frequency shift of the radar return, the frequency shift being induced by the relative motion of the radar sensor 102 and the calibration target 104. In these embodiments, the calibration component 222 can be configured to compute a second measured azimuth angle to the point based upon the radial velocity indicated in the detections. The calibration component 222 can compute a correction factor for the first measured azimuth angle computed based upon angle estimation techniques taking the second measured azimuth angle as a ground truth value. In a non-limiting example, the calibration component 222 computes a correction factor for the first measured azimuth angle as being the difference between the first measured azimuth angle (computed based upon angle estimation techniques) and the second measured azimuth angle (computed based upon the relative motion of the radar sensor 102 and the calibration target 104).

The correction factors included in the calibration data 224 can collectively make up a lookup table. The lookup table can be a two-dimensional lookup table that includes a correction factor for each of a plurality of azimuth-elevation angle pairs. In various embodiments, the lookup table can include a correction factor for each of a plurality of azimuth-elevation angle pairs that are separated by uniform angular distances. For instance, the calibration data 224 can include a correction factor for each azimuth-elevation angle pair separated by one-degree increments. Stated differently, the calibration data 224 can include uniformly-spaced correction factors that cover the entirety of the FOV 108 of the radar sensor 102 in one-degree increments in each of azimuth and elevation. In other exemplary embodiments, the spacing of the azimuth-elevation pairs for which the correction factors are defined can be less than or equal to 0.5 degrees, less than or equal to 0.25 degrees, or less than or equal to 0.1 degrees. Locations of the correction factors and t the spacing between correction factors referenced above refers to their initial azimuth-elevation angles.

In some embodiments, the calibration component 222 can be configured to compute interpolated correction factors to account for non-uniform spacing of detections output by the radar analysis component 216 and achieve desired spacing of the correction factors in the calibration data 224. For example, and with reference now to FIG. 4, an exemplary detection grid 400 is shown. The detection grid 400 is defined across horizontal azimuth and vertical elevation. The detection grid 400 is representative of an extent of the FOV 108 of the radar sensor 102. Intersection points of gridlines of the detection grid 400 (e.g., intersection point 402) are representative of azimuth-elevation coordinate pairs for which the calibration data 224 is desirably defined (i.e., by correction factors). Accordingly, a distance between gridlines in each of the azimuth and elevation directions is representative of a resolution of the calibration data 224.

Figure 4:
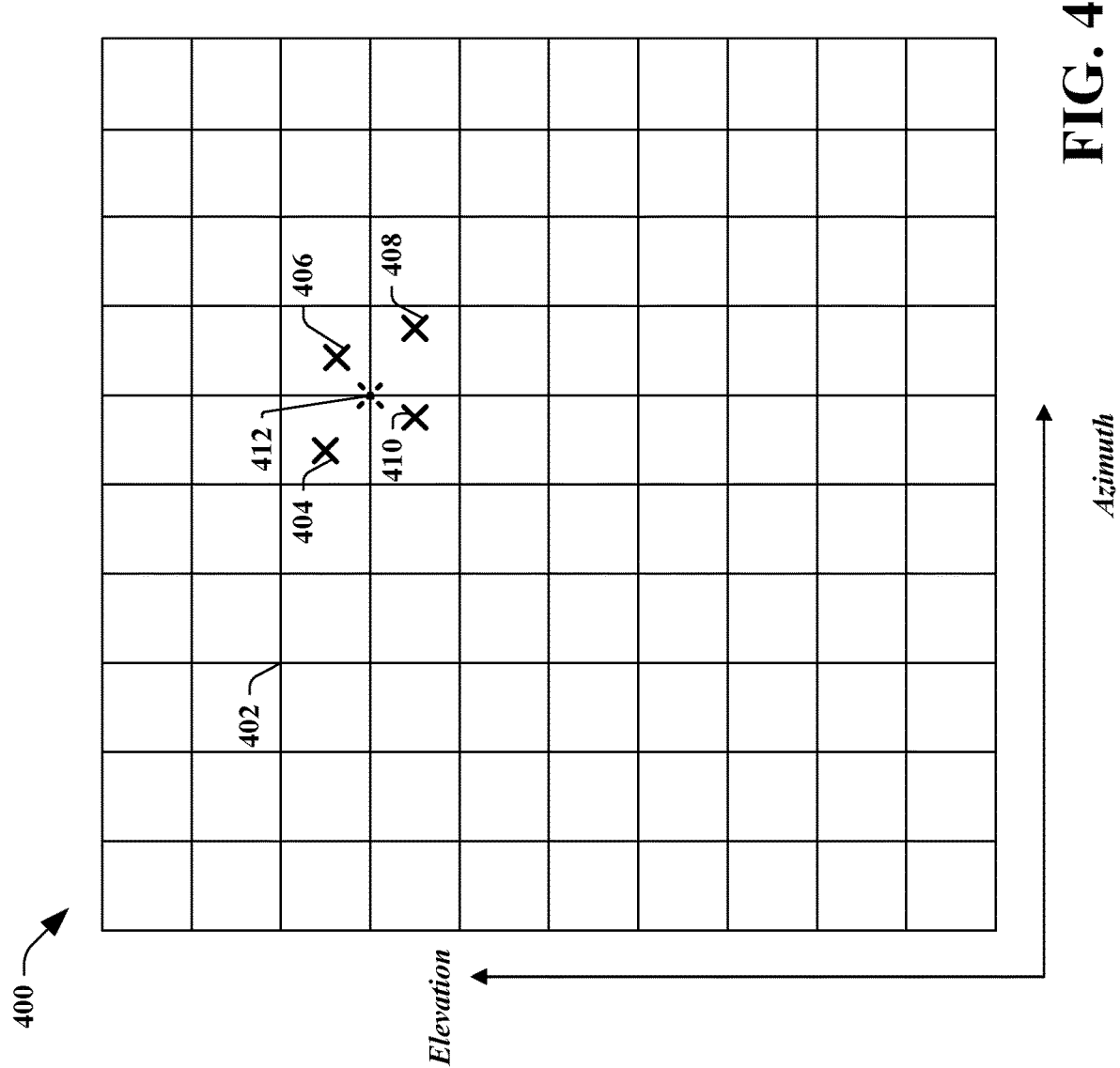
FIG. 4 is an exemplary grid of detections output by a radar sensor.

The detection grid 400 of FIG. 4 shows a plurality of detections 404-410. The detections 404-410 can be detections computed by the radar analysis component 216 based upon returns received by the radar sensor 102 during the relative motion of the radar sensor 102 and the calibration target 104, as described above. Locations of the detections 404-410 on the detection grid 400 are defined by the initial azimuth-elevation angle pairs associated with the detections (e.g., as opposed to the known position of the calibration target 104). The detections 404-410 have corresponding correction factors (not shown) that represent the difference between the locations of the detections 404-410 on the grid and the actual location of the calibration target 104 within the grid. As shown in FIG. 4, none of the detections 404-410 lie on an intersection point of the detection grid 400 corresponding to an azimuth-elevation angle pair for which a correction factor is desirably defined (e.g., in order to develop a uniformly spaced set of correction factors). In various embodiments, the calibration component 222 can be configured to perform interpolation based upon the detections 404-410 to identify an interpolated correction factor corresponding to an azimuth-elevation angle pair 412. By way of example, and not limitation, the calibration component 222 can compute an interpolated azimuth correction factor value for the angle pair 412 based upon the azimuth values of the correction factors associated with the detections 404-410. Furthering the example, the calibration component 222 can compute an interpolated elevation correction factor value for the angle pair 412 based upon the elevation values of the correction factors associated with the detections 404-410. The interpolated correction factor is a correction factor that can be used to identify an expected true value of a location of an object when the radar sensor 102 measures that the object is at the azimuth-elevation angles of the azimuth-elevation angle pair 412. The calibration component 222 can include the interpolated correction factor in the calibration data 224. In exemplary embodiments, the calibration component 222 can be configured to include in the calibration data 224 only correction values that are within a threshold distance of a pre-defined azimuth-elevation angle pair. In some embodiments, the calibration component 222 can be configured to include in the calibration data 224 only correction values that are interpolated to pre-defined azimuth-elevation angle pairs. In other embodiments, the calibration component 222 can be configured to include in the calibration data 224 all computed correction values.

In order to ensure that the radar sensor 102 outputs a sufficiently dense field of detections for the calibration component 222 to interpolate to a predefined number of azimuth-elevation angle pairs, multiple data collection runs can be performed. For instance, a first run can be performed by the positioning device 106 moving the radar sensor 102 from a first position to a second position during which the radar sensor 102 collects radar returns from the calibration target 104. During this first run, the radar sensor 102 can output a first plurality of detections. A second run can then be performed by the positioning device 106 moving the radar sensor 102

Subsequent to the radar analysis component 216 being programmed to include the calibration data 224, the radar sensor can output detections that are based upon the calibration data 224. In an illustrative example, subsequent to being programmed by the computing device 202, the radar sensor 102 can be taken to an operational environment (e.g., the radar sensor 102 can be mounted on a car and the car driven to its driving environment). The radar sensor 102 can receive a radar return from the operational environment. In an exemplary embodiment, the radar analysis component 216 can compute an initial detection based upon the radar return received by the radar sensor 102, wherein the initial detection includes an initial azimuth angle and an initial elevation angle. In the exemplary embodiment, the radar analysis component 216 can look up the initial azimuth angle/initial elevation angle pair in the calibration data 224 and output a detection that comprises a corrected azimuth angle and corrected elevation angle that corresponds to the initial azimuth/initial elevation pair in the calibration data 224. In various embodiments, the initial azimuth/elevation angle pair computed by the radar analysis component 216 may not have an exact corresponding value in the calibration data 224. In such embodiments, the radar analysis component 216 can be configured to interpolate between correction factors defined in the calibration data 224 to identify an interpolated correction factor corresponding to a position of the initial azimuth-elevation angle pair. The radar analysis component 216 can then output a detection that is based upon the initial azimuth/elevation angle pair and the interpolated correction factor.

It is to be understood that in some embodiments, elevation angles can be computed by the radar analysis component 216 based upon relative motion of the radar sensor 102 and the calibration target 104 in similar fashion to the computation of azimuth angles described above. For instance, after an initial pass during which rows of antennas of the sensor 102 are arranged horizontally and columns of antennas of the radar sensor 102 are arranged vertically, the radar sensor 102 can be rotated by 90° such that the rows of antennas of the sensor 102 are arranged vertically and columns of antennas of the sensor 102 are arranged horizontally. The positioning device 106 can then cause relative motion between the radar sensor 102 and the calibration target 104, as described above. During this relative motion, the radar sensor 102 can receive a second set of radar returns in addition to a first set of returns used to compute azimuth angles based upon the relative motion of the radar sensor 102 and the calibration target 104. For these second returns, elevation angles can be computed based upon the second returns and the relative motion of the radar sensor 102 and the calibration target 104, for example using Equation 1 and replacing azimuth angle $\phi$ with elevation angle $\theta$.

Figure 5:
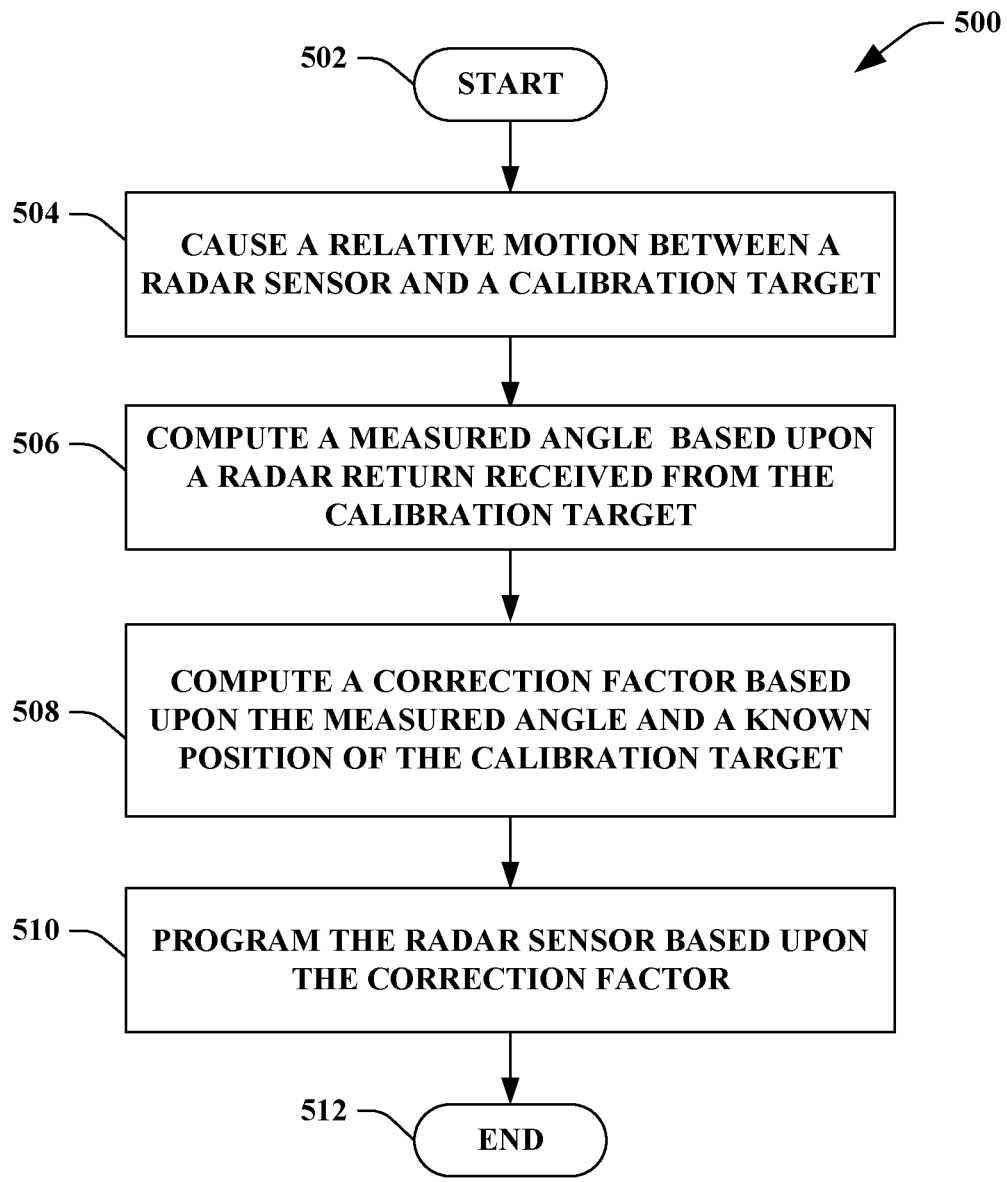
FIG. 5 is a flow diagram illustrating an exemplary methodology for calibrating a radar sensor.
Figure 6:
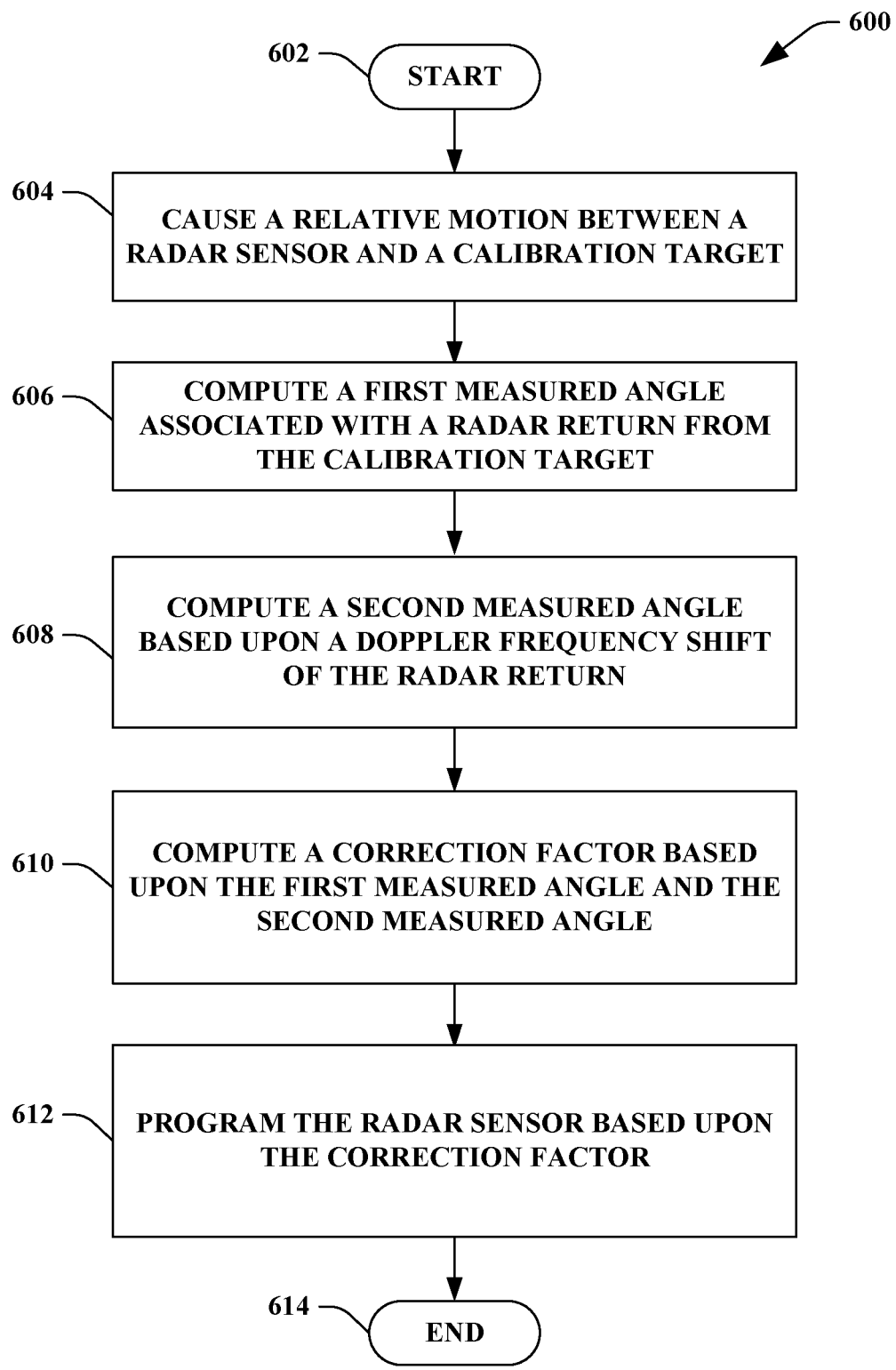
FIG. 6 is a flow diagram illustrating another exemplary methodology for calibrating a radar sensor.

FIGS. 5 and 6 illustrate methodologies relating to calibrating a radar sensor by employing SAR principles. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, an exemplary methodology 500 for calibrating a radar sensor based upon SAR principles is illustrated. The methodology 500 begins at 502 and at 504, a relative motion is induced between a radar sensor that is desirably calibrated and a calibration target. In exemplary embodiments, the motion can be straight line motion of the radar sensor in a direction that is orthogonal to an aiming direction of the FOV of the radar sensor (e.g., while the calibration is fixed at a location within the FOV). At 506, a measured angle to a point on the calibration target relative to the aiming direction of the FOV of the radar sensor is computed based upon a radar return received from the calibration target during the relative motion of the radar sensor and the calibration target. In an example, the measured angle can be an azimuth angle. In another example, the measured angle can be an elevation angle. The azimuth angle or the elevation angle can be computed based upon a radial velocity of the radar sensor to the point and the velocity of the radar sensor in a direction normal to the aiming angle of the FOV. At 508, a correction factor is computed based upon the measured angle and a known position of the calibration target. In an example wherein the measured angle is an azimuth angle, the correction factor can be computed as the difference between the measured angle and an azimuth angle to a known position of the point on the calibration target. At 510, the radar sensor is programmed based upon the correction factor. Subsequent to being programmed, the radar sensor can be taken to an operational environment, and a radar return can be received from a point in the operational environment by the radar sensor. Responsive to the radar sensor determining that the radar return is indicative of a same measured angle as computed at 506, the radar sensor can add the correction factor to the measured angle to compute a corrected angle. The radar sensor can then output a detection that indicates that the point in the operational environment has a position at the corrected angle. The methodology 500 ends at 512.

Referring now to FIG. 6, another exemplary methodology 600 for calibrating a radar sensor based upon SAR principles is illustrated. The methodology 600 begins at 602 and at 604, a relative motion is induced between a radar sensor that is desirably calibrated and a calibration target. At 606, a first measured angle is computed based upon a radar return received from the calibration target. By way of example, and not limitation, the first measured angle can be an azimuth angle to a point on the calibration target from the aiming direction of the FOV of the radar sensor. The first measured angle can be computed based upon angle estimation techniques (e.g., TDOA between a first antenna of the radar sensor and a second antenna of the radar sensor). At 608, a second measured angle is computed based upon a doppler frequency shift of the radar return. The radar sensor can be configured to identify the doppler frequency shift of the radar return relative to the radar signal transmitted toward the calibration target by the radar sensor. Based upon the doppler frequency shift, the radar sensor can compute a radial velocity of the radar sensor relative to the point on the calibration target from which the radar return was received. The radar sensor can compute the second measured angle to the point based upon the radial velocity and the relative motion of the radar sensor and the calibration target. In a non-limiting example, the radar sensor can compute the second measured angle based upon Equation 1, solving for azimuth angle $\phi$.

At 610, a correction factor is computed based upon the first measured angle and the second measured angle. By way of example, the correction factor can be computed as the difference between the second measured angle and the first measured angle. In some embodiments, the radar sensor can be configured to compute the correction factor. For example, a control input can be provided to the radar sensor that is configured to cause the radar sensor to enter a calibration mode, whereupon the radar sensor computes correction factors based upon returns received by the radar sensor. In other embodiments, subsequent to computing the first measured angle at 606, the radar sensor can be configured to output a detection to a computing device, wherein the detection includes the first measured angle and at least one of the doppler frequency shift of the return or the radial velocity to the point. In these embodiments, the computing device is configured to compute the second measured angle at 608 based upon the doppler frequency shift or the radial velocity indicated in the detection, and the computing device then computes the correction factor at 610. At 612, the radar sensor is programmed based upon the correction factor such that, when the radar sensor receives a radar return subsequent to being programmed, the radar sensor outputs a detection based upon the radar return and the correction factor. The methodology 600 ends at 614.

Figure 7:
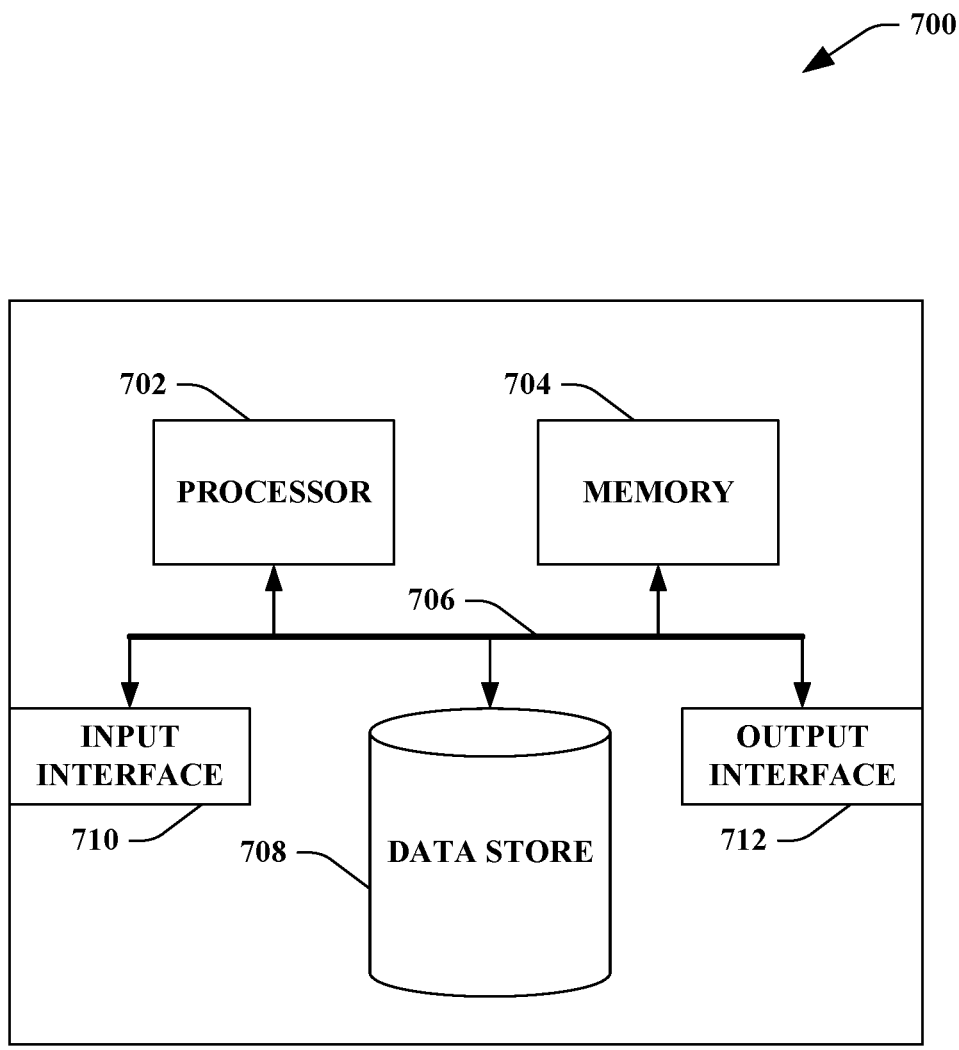
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be or include the computing device 202. The computing device 700 includes at least one processor 702 that executes instructions that are stored in a memory 704. The instructions may be, for instance, instructions for implementing functionality described as being carried out by one or more modules, components, or systems discussed above or instructions for implementing one or more of the methods described above. The processor 702 may be a GPU, a plurality of GPUs, a CPU, a plurality of CPUs, a multi-core processor, etc. The processor 702 may access the memory 704 by way of a system bus 706. In addition to storing executable instructions, the memory 704 may also store radar data, calibration data, velocity data pertaining to a radar sensor, etc.

The computing device 700 additionally includes a data store 708 that is accessible by the processor 702 by way of the system bus 706. The data store 708 may include executable instructions, radar returns, calibration data, velocity data pertaining to a radar sensor, etc. The computing device 700 also includes an input interface 710 that allows external devices to communicate with the computing device 700. For instance, the input interface 710 may be used to receive instructions from an external computing device, etc. The computing device 700 also includes an output interface 712 that interfaces the computing device 700 with one or more external devices. For example, the computing device 700 may transmit control data to a positioning device by way of the output interface 712. In another example, the computing device 700 may transmit calibration data or programming instructions that include calibration data to a radar sensor by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Application-specific Standard Products (ASSPs), System-on-a-chip systems (SOCs), Complex Programmable Logic Devices (CPLDs), etc.

The features described herein relate to systems and methods for calibrating a radar sensor according to at least the examples provided below:

(A1) In one aspect, some embodiments include a method, where the method includes causing a relative motion between a radar sensor and a calibration target such that the calibration target moves across a field of view (FOV) of the radar sensor. The method further includes, responsive to receiving a first radar return from the calibration target as the calibration target moves across the FOV of the radar sensor, computing a measured angle from the radar sensor to a point on the calibration target based upon the first radar return and the relative motion between the radar sensor and the calibration target. The method additionally includes computing, based upon the measured angle and a known position of the calibration target, a correction factor and programming the radar sensor based upon the correction factor such that subsequent to being programmed and responsive to receipt of a second radar return, the radar sensor computes a second detection based upon the correction factor and the second radar return.

(A2) In some embodiments of the method of (A1), the correction factor comprises a difference between the measured angle and the known position of the calibration target.

(A3) In some embodiments of the method of at least one of (A1)-(A2), the relative motion between the radar sensor and the calibration target is in a direction normal to an aiming direction of the FOV of the radar sensor.

(A4) In some embodiments of the method of at least one of (A1)-(A3) causing the relative motion between the radar sensor and the calibration target comprises keeping a position of the calibration target fixed while moving the radar sensor.

(A5) In some embodiments of the method of at least one of (A1)-(A3) causing the relative motion between the radar sensor and the calibration target comprises keeping a position of the radar sensor fixed while moving the calibration target.

(A6) In some embodiments of the method of at least one of (A1)-(A5) further includes computing a radial velocity of the radar sensor relative to the point on the calibration target based upon the radar return and computing the measured angle based upon the radial velocity and the relative motion of the radar sensor and the calibration target.

(A7) In some embodiments of the method of at least one of (A1)-(A6), the measured angle is an azimuth angle.

(A8) In some embodiments of the method of at least one of (A1)-(A7), the measured angle is an elevation angle.

(A9) In some embodiments of the method of at least one of (A1)-(A8), the method further includes receiving a plurality of radar returns from the calibration target at the radar sensor during the relative motion of the radar sensor and the calibration target; and computing a plurality of measured angles based upon the received radar returns and the relative motion of the radar sensor the calibration target; and computing a plurality of correction factors that comprises a respective correction factor for each of the measured angles based upon the known position of the calibration target, wherein the programming of the radar sensor is based further upon the plurality of correction factors.

(A10) In some embodiments of the method of (A9), the method further includes computing an interpolated correction factor based upon a first correction factor and a second correction factor in the correction factors, wherein the programming of the radar sensor is based further upon the interpolated correction factor.

(B1) In another aspect some embodiments include a system for radar sensor calibration that includes a calibration target. The system for radar sensor calibration further includes a radar sensor positioned such that the calibration target is within a field-of-view (FOV) of the radar sensor. The radar sensor includes an antenna array configured to receive a first radar return from the calibration target in the FOV of the radar sensor and a hardware logic component configured to output a first detection based upon the first radar return, the first detection indicative of a position of a point on the calibration target. The system for radar sensor calibration further includes a positioning device that is configured to cause a relative motion between the calibration target and the radar sensor as the antenna array receives the first radar return. The system also includes a computing device that is configured to perform various acts. The various acts performed by the computing device include responsive to receipt of the first detection from the hardware logic component, computing a correction factor based upon a known position of the calibration target and the first detection. The various acts performed by the computing device further include programming the hardware logic component of the radar sensor such that, subsequent to being programmed, the hardware logic component outputs a second detection based upon a second radar return and the correction factor.

(B2) In some embodiments of the system for radar sensor calibration of (B1) the first detection comprises a measured angle from the radar sensor to the point on the calibration target.

(B3) In some embodiments of the system for radar sensor calibration of (B1), computing the first detection comprises computing the measured angle based upon a frequency shift of the first radar return, the frequency shift of the first radar return based upon the relative motion between the radar sensor and the calibration target.

(B4) In some embodiments of the system for radar sensor calibration of at least one of (B1)-(B3), a surface of the calibration target is composed of a radar absorbing material.

(B5) In some embodiments of the system for radar sensor calibration of at least one of (B1)-(B4) the calibration target comprises a wall extending in a first direction, wherein the FOV of the radar sensor is aimed in a second direction that is orthogonal to the first direction.

(B6) In some embodiments of the system for radar sensor calibration of (B5) the positioning device is a linear positioner that is configured to move the radar sensor along a third direction that is parallel to the first direction.

(B7) In some embodiments of the system for radar sensor calibration of at least one of (B1)-(B6) the antenna array is a two-dimensional antenna array.

(B8) In some embodiments of the system for radar sensor calibration of at least one of (B1)-(B7) the method further includes computing the known position of the calibration target based upon the relative motion between the calibration target and the radar sensor.

(C1) In still another aspect, a method for calibrating a radar sensor includes causing a relative motion between a radar sensor and a calibration target such that the calibration target moves across a field of view (FOV) of the radar sensor. The method also includes, responsive to receiving a first radar return from the calibration target during the relative motion between the radar sensor and the calibration target, computing a first measured angle from the radar sensor to a point on the calibration target based upon the first radar return. The method further includes computing a second measured angle from the radar sensor to the point on the calibration target based upon doppler frequency shift of the first radar return caused by the relative motion of the radar sensor and the calibration target. The method additionally includes computing, based upon the first measured angle and the second measured angle, a correction factor. The method also includes programming the radar sensor based upon the correction factor such that subsequent to being programmed and responsive to receipt of a second radar return, the radar sensor computes a second detection based upon the correction factor and the second radar return.

(C2) In some embodiments of the method of (C1), computing the first measured angle is based upon time difference of arrival of the first radar return at a first radar antenna of the radar sensor and a second radar antenna of the radar sensor.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for calibrating a radar sensor, the method comprising:
   causing a relative motion between the radar sensor and a calibration target such that the calibration target moves across a field of view (FOV) of the radar sensor;
   responsive to receiving a first radar return from the calibration target as the calibration target moves across the FOV of the radar sensor, computing a first measured angle from the radar sensor to a point on the calibration target based upon a time difference of arrival of the first radar return at a first antenna and a second antenna of the radar sensor;
   computing a second measured angle from the radar sensor to the point on the calibration target, wherein computing the second measured angle comprises:
      computing a radial velocity of the calibration target relative to the radar sensor based upon a Doppler frequency shift of the first radar return; and
      computing the second measured angle as an inverse sine of a ratio of the radial velocity to a forward velocity of the relative motion in a direction normal to a reference direction at a center of the FOV of the radar sensor;
   computing, based upon the first measured angle, the second measured angle, and a known position of the calibration target, a correction factor; and
   programming the radar sensor based upon the correction factor such that subsequent to being programmed and responsive to receipt of a second radar return, the radar sensor computes a second detection based upon the correction factor and the second radar return.

2. The method of claim 1, wherein the correction factor comprises a difference between the first measured angle and the known position of the calibration target.

3. The method of claim 1, wherein the relative motion between the radar sensor and the calibration target is in a direction normal to an aiming direction of the FOV of the radar sensor.

4. The method of claim 1, wherein causing the relative motion between the radar sensor and the calibration target comprises keeping a position of the calibration target fixed while moving the radar sensor.

5. The method of claim 1, wherein causing the relative motion between the radar sensor and the calibration target comprises keeping a position of the radar sensor fixed while moving the calibration target.

6. The method of claim 1, wherein the first measured angle is an azimuth angle.

7. The method of claim 1, wherein the first measured angle is an elevation angle.

8. The method of claim 1, further comprising:
   receiving a plurality of radar returns from the calibration target at the radar sensor during the relative motion of the radar sensor and the calibration target;
   computing a plurality of measured angles based upon the plurality of radar returns and the relative motion of the radar sensor and the calibration target; and
   computing a plurality of correction factors that comprises a respective correction factor for each of the measured angles based upon the known position of the calibration target, wherein the programming of the radar sensor is based further upon the plurality of correction factors.

9. The method of claim 8, further comprising:
   computing an interpolated correction factor based upon a first correction factor and a second correction factor in the correction factors, wherein the programming of the radar sensor is based further upon the interpolated correction factor.

10. A system for radar sensor calibration, comprising:
a calibration target;
a radar sensor positioned such that the calibration target is within a field-of-view (FOV) of the radar sensor, the radar sensor comprising:
  an antenna array configured to receive a first radar return from the calibration target in the FOV of the radar sensor; and
  a hardware logic component configured to output a first detection based upon the first radar return, the first detection indicative of a position of a point on the calibration target, wherein the first detection comprises a first measured angle from the radar sensor to the point on the calibration target and a second measured angle from the radar sensor to the point on the calibration target, and wherein the first measured angle from the radar sensor to the point on the calibration target is computed based upon a time difference of arrival of the first radar return at a first antenna and a second antenna of the radar sensor, wherein computing the second measured angle comprises:
    computing a radial velocity of the calibration target relative to the radar sensor based upon a Doppler frequency shift of the first radar return; and
    computing the second measured angle as an inverse sine of a ratio of the radial velocity to a forward velocity of relative motion in a direction normal to a reference direction at a center of the FOV of the radar sensor;
a positioning device that is configured to cause the relative motion between the calibration target and the radar sensor as the antenna array receives the first radar return; and
a computing device that is configured to perform acts comprising:
  responsive to receipt of the first detection from the hardware logic component, computing a correction factor based upon the first measured angle, the second measured angle, and a known position of the calibration target; and
  programming the hardware logic component of the radar sensor such that, subsequent to being programmed, the hardware logic component outputs a second detection based upon a second radar return and the correction factor.

11. The system of claim 10, wherein the first measured angle is further computed based upon a frequency shift of the first radar return, the frequency shift of the first radar return based upon the relative motion between the radar sensor and the calibration target.

12. The system of claim 10, wherein a surface of the calibration target is composed of a radar absorbing material.

13. The system of claim 10, wherein the calibration target comprises a wall extending in a first direction, wherein the FOV of the radar sensor is aimed in a second direction that is orthogonal to the first direction.

14. The system of claim 13, wherein the positioning device is a linear positioner that is configured to move the radar sensor along a third direction that is parallel to the first direction.

15. The system of claim 10, wherein the antenna array is a two-dimensional antenna array.

16. The system of claim 10, wherein the acts further comprise:
  computing the known position of the calibration target based upon the relative motion between the calibration target and the radar sensor.

17. A method for calibrating a radar sensor, comprising:
causing a relative motion between the radar sensor and a calibration target such that the calibration target moves across a field of view (FOV) of the radar sensor;
responsive to receiving a first radar return from the calibration target during the relative motion between the radar sensor and the calibration target, computing a first measured angle from the radar sensor to a point on the calibration target based upon a time difference of arrival of the first radar return at a first antenna and a second antenna of the radar sensor;
computing a second measured angle from the radar sensor to the point on the calibration target, wherein computing the second measured angle comprises:
  computing a radial velocity of the calibration target relative to the radar sensor based upon a Doppler frequency shift of the first radar return; and
  computing the second measured angle as an inverse sine of a ratio of the radial velocity to a forward velocity of the relative motion in a direction normal to a reference direction at a center of the FOV of the radar sensor;
computing, based upon the first measured angle and the second measured angle, a correction factor; and
programming the radar sensor based upon the correction factor such that subsequent to being programmed and responsive to receipt of a second radar return, the radar sensor computes a second detection based upon the correction factor and the second radar return.

18. The method of claim 17, wherein the first antenna is located in a first row of the radar sensor and the second antenna is located in a second row of the radar sensor.

19. The method of claim 17, wherein causing the relative motion between the radar sensor and the calibration target comprises keeping a position of the radar sensor fixed while moving the calibration target.

* * * * *